United States Patent [19]
Blanc et al.

[11] Patent Number: 5,773,963
[45] Date of Patent: Jun. 30, 1998

[54] METHOD AND APPARATUS FOR PROGRAMMABLY ADJUSTING OUTPUT VOLTAGE OF A BATTERY CHARGER

[75] Inventors: James J. Blanc, San Mateo; Mark C. Gurries, San Jose, both of Calif.

[73] Assignee: Apple Computer Inc., Cupertino, Calif.

[21] Appl. No.: 705,357

[22] Filed: Aug. 29, 1996

[51] Int. Cl.[6] .................................. H02J 7/04; H02J 7/16
[52] U.S. Cl. ........................................... 320/145; 320/164
[58] Field of Search .................................. 320/21, 22, 23, 320/32, 39, 49, 134, 139, 143, 145, 164

[56] References Cited

U.S. PATENT DOCUMENTS

| | | | |
|---|---|---|---|
| 4,924,169 | 5/1990 | Shifflet et al. | 320/21 |
| 5,477,132 | 12/1995 | Canter et al. | 323/282 |
| 5,554,921 | 9/1996 | Li et al. | 320/22 |
| 5,557,192 | 9/1996 | Tamai | 320/30 |
| 5,561,361 | 10/1996 | Sangupta et al. | 320/14 |
| 5,617,007 | 4/1997 | Keidl et al. | 320/22 |

Primary Examiner—Edward Tso
Attorney, Agent, or Firm—Richard C. Liu

[57] ABSTRACT

An apparatus for programmably adjusting output voltage of a constant-voltage battery charger is disclosed. The present invention includes a power circuit for generating an output voltage for charging batteries. This power circuit generates this output voltage as a function of an incoming power source and an incoming error signal. The invention further includes a controller for providing a pulse width modulated (PWM) signal operating at a pre-determined frequency. This PWM signal controls the effective divider ratio of a voltage divider network which is implemented, among other things, for generating the error signal to be fed to the power circuit. The present invention varies the effective divider ratio by programmably applying the pulse width modulated signal from the controller. As a result, the output voltage from the power circuit can be varied to optimally charge batteries of differing types and technologies.

11 Claims, 2 Drawing Sheets

METHOD AND APPARATUS FOR PROGRAMMABLY ADJUSTING OUTPUT VOLTAGE OF A BATTERY CHARGER

FIELD OF THE INVENTION

The present invention relates generally to a battery charging circuit and an electronic device including the same, and more specifically, relates to a constant-voltage battery charging circuit which is adapted to programmably adjust its output voltage to more efficiently charge batteries of differing technologies requiring differing optimal voltages.

BACKGROUND INFORMATION

There are numerous electronic devices in the market today requiring the use of batteries either as a primary source of power or as a backup power source. These devices include laptop computers, Personal Digital Assistants (PDAs), video camera and other audio-visual devices.

Generally, either a constant voltage or a constant current power source is used for charging and recharging batteries. Some types of batteries require a charger circuit which provides a constant current charger, for example, nickel metal hydride batteries; whereas other battery chemistries, such as lithium ion (LI) and lead acid batteries, require a constant voltage charger. For batteries requiring a constant voltage charger, the battery manufacturers specify the charge voltage levels necessary to optimize the charging process specific to those batteries; and these voltages typically are not the same. On the one hand, if the charger output voltage is set above the manufacturer-specified voltage for batteries of a given type, then the batteries are likely to be destroyed, either functionally or literally. On the other hand, if the charger output voltage is set lower than the specified optimal voltage, then the charging would be inefficient whereby reducing the equipment (battery load) run time usage.

In order to maximize the runtime usage, it is important that the battery charger provides an accurate output voltage conforming to the voltage specified by the battery manufacturer. One known implementation for accurate voltage output is to use precision analog components, for example, voltage reference and resistive divider network as a part of the voltage output feedback control. Such a circuit does provide high accuracy in maintaining a voltage level; unfortunately, that voltage is fixed, typically in hardware, at a single value suitable only for charging batteries of a single battery technology. Electronic device designers have been either rigidly limited a given system to a single manufacturer's battery with no flexibility of accommodating other types of battery or, if must, have been setting the charging voltage at the level dictated by the type of battery having the lowest manufacturer-specified charging voltage whereby trading in battery runtime for operation safety.

Known implementations of constant-voltage battery chargers have difficulties in accommodating batteries of differing types or technologies in any given electronic device without having to sacrifice battery runtime.

SUMMARY OF THE INVENTION

It would be desirable and therefore an object for the present invention to provide an battery charging apparatus to allow more than one battery type to be used in a given electronic device without compromising either safety or battery runtime. It is another object for the present invention to allow for battery charging upgradability if a new battery technology is developed after an incorporating electronic device has already been introduced to the market. An important consequence of the aforementioned objects is the flexibility in battery type and technology selection, in device manufacturing logistics and in device product availability.

Additional objects and advantages of the present invention will be set forth in the description which follows, and in part, will be obvious from the description or may be learned by practice of the invention. To achieve the foregoing objects, and in accordance with the purpose of the invention as embodied and broadly described herein, there is provided a charging apparatus for programmably varying its output voltage for a constant-voltage battery charging operation by dynamically adjusting the effective divider ratio of a typical resistive voltage divider network which is implemented as a part of the feedback control for the charging apparatus.

One aspect of the present invention includes the use of a controller for providing a control signal, for example, a pulse width modulated (PWM) output signal to control the output voltage of the charging apparatus ranging between a minimum and a maximum value. Another aspect of the invention includes a transistive element, for example, a MOSFET, disposed in series with a resistive control element and both of which are placed in electrical parallel with one of the resistive elements in the voltage divider network; more specifically, both of which are placed in a manner that one end of this serial combination connects to an electrical ground. Yet another aspect of the present invention discloses the controller being a microcontroller which is adapted for switching the transistive element ON and OFF as a function of the control signal coming from the microcontroller and operating at a predetermined frequency. "Viewing" the voltage divider network at a frequency much lower than the pre-determined frequency of the control signal would provide an effective divider ratio of the voltage divider network different from the voltage divider ratio had there been no control signal coming from the microcontroller. Under this implementation, the output voltage for the battery charging apparatus can be programmably varied as a function of the effective divider ratio of the voltage divider network in the apparatus and in turn, it, the effective voltage divider ratio, is being varied as a function of the control signal coming from the microcontroller. In this manner, the output voltages from the battery charging apparatus can be applied to optimally charge batteries of differing types and technologies.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Reference will now be made in detail to a preferred embodiment of the invention, a circuit schematic of which is illustrated in the accompanying drawings. While the invention will be described in conjunction with the preferred embodiment, it will be understood that they are not intended to limit the invention to this embodiment. On the contrary, the invention is intended to cover alternatives, modifications, and equivalents, which may be included within the spirit and scope of the invention as defined by the appended claims.

With today's circuit device technology, the development of specialized circuits and programmable logic generally do not require the rendering of fully detailed circuit diagrams. For example, microcontrollers are known to operate based on a desired set of functionalities rendered into software that is compatible with a selected microcontroller. Accordingly, portions of the present invention will be described primarily in terms of functionality to be implemented by a microcontroller and other associated electronic components. Those of ordinary skill in the art, once given the following descriptions of the various functions to be carried out by the present invention will be able to implement the necessary microcontroller structure and logic for various circuit devices or custom designed integrated circuits in suitable technologies without undue experimentation.

Figure 1:
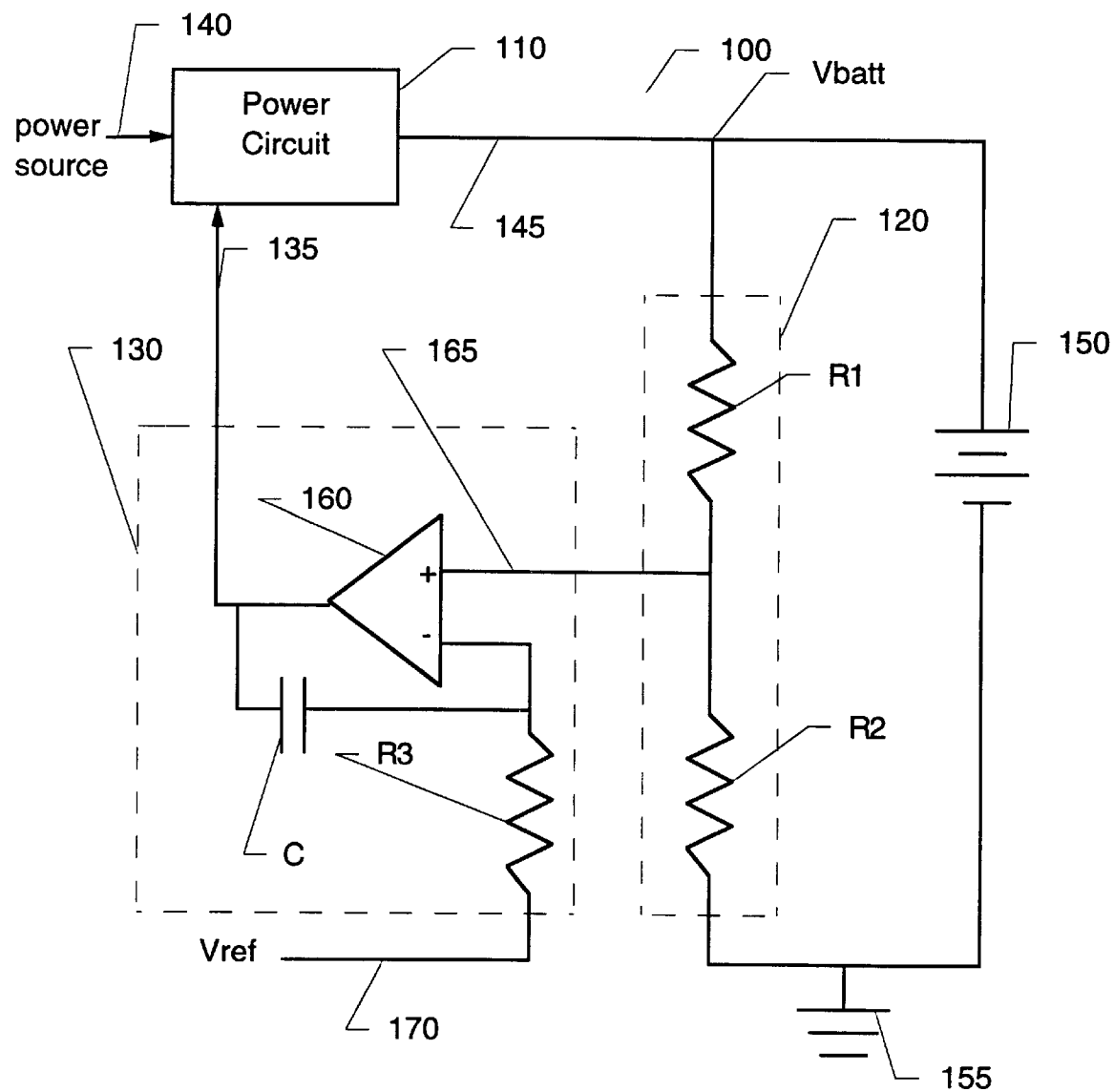
FIG. 1 is a simplified schematic diagram illustrating a prior art apparatus for constant-voltage charging.

FIG. 1 is a circuit schematic diagram illustrating a typically implemented apparatus 100 for constant-voltage battery charging operation. This apparatus 100 includes a power circuit 110, a resistive divider network 120, and an error amplifier circuit 130. The power circuit 110 receives the output of the error amplifier circuit 130 via a lead 135. The power circuit 110 further receives power from a power source 140 external to this apparatus 100 and this power source 140 includes an A.C. source from a wall outlet. In turn, the power circuit 110 generates an output voltage $V_{batt}$ to be applied via a lead 145 to a battery or a plurality of batteries 150, and to the resistive divider network 120 which is in electrical parallel with the battery(s) 150. The detailed circuit schematic for the power circuit 110 is not shown in the accompanying drawings because the designs for implementing its functionalities described herein have been well known to the artisans.

In one implementation, the resistive voltage network 120 includes resistors $R_1$ and $R_2$ connected in series. This resistive voltage network 120, $R_1$ and $R_2$, forms a electrical parallel combination with the battery(ies) 150 and this parallel combination further connects to the power circuit 110 via lead 145 on one end of the combination and connects to an electrical ground 155 on the other end of the combination.

The error amplifier circuit 130 includes preferably an operational amplifier 160 having an signal output feeding into the power circuit 110 via lead 135, and further includes a capacitor C and a resistor $R_3$ both of which are configured for barring any DC current from traveling from path 170 to path 135 and at the same time for controlling the frequency sensitivity of the operational amplifier 160. The error amplifier circuit 130 via a lead 165 taps the voltage across resistor $R_2$ of the voltage divider network 120 as an input into the operational amplifier 160. The operational amplifier 160 via lead 170 further receives a fixed, typically hardwired, reference voltage $V_{ref}$ as another input. This reference voltage $V_{ref}$ is appropriately selected so that the output voltage $V_{batt}$ resulting from the power circuit 110 for charging the battery (ies) 150 is the manufacturer-specified voltage for the given battery(ies) 150.

FIG. 1 illustrates a typical voltage control servo loop. The operational amplifier 160 is used to integrate the difference between the reference voltage $V_{ref}$ and the voltage across the resistor $R_2$ which is the output voltage $V_{batt}$ from the power circuit 110 divided down by resistors $R_1$ and $R_2$. The signal output of the operational amplifier 160 is used as a feedback to control the power circuit 110 of this typically implemented battery charging apparatus 100—whereby maintaining the output voltage $V_{batt}$ used for charging the battery(ies) 150 at a predetermined value, usually the manufacturer-specified voltage for the given battery type and model. The steady state output voltage $V_{batt}$ from the power circuit 110 of this apparatus 100 is given by the following Equation 1:

$$V_{batt}=V_{ref}\times(R_1+R_2)/R_2. \qquad (Eq.\ 1)$$

Figure 2:
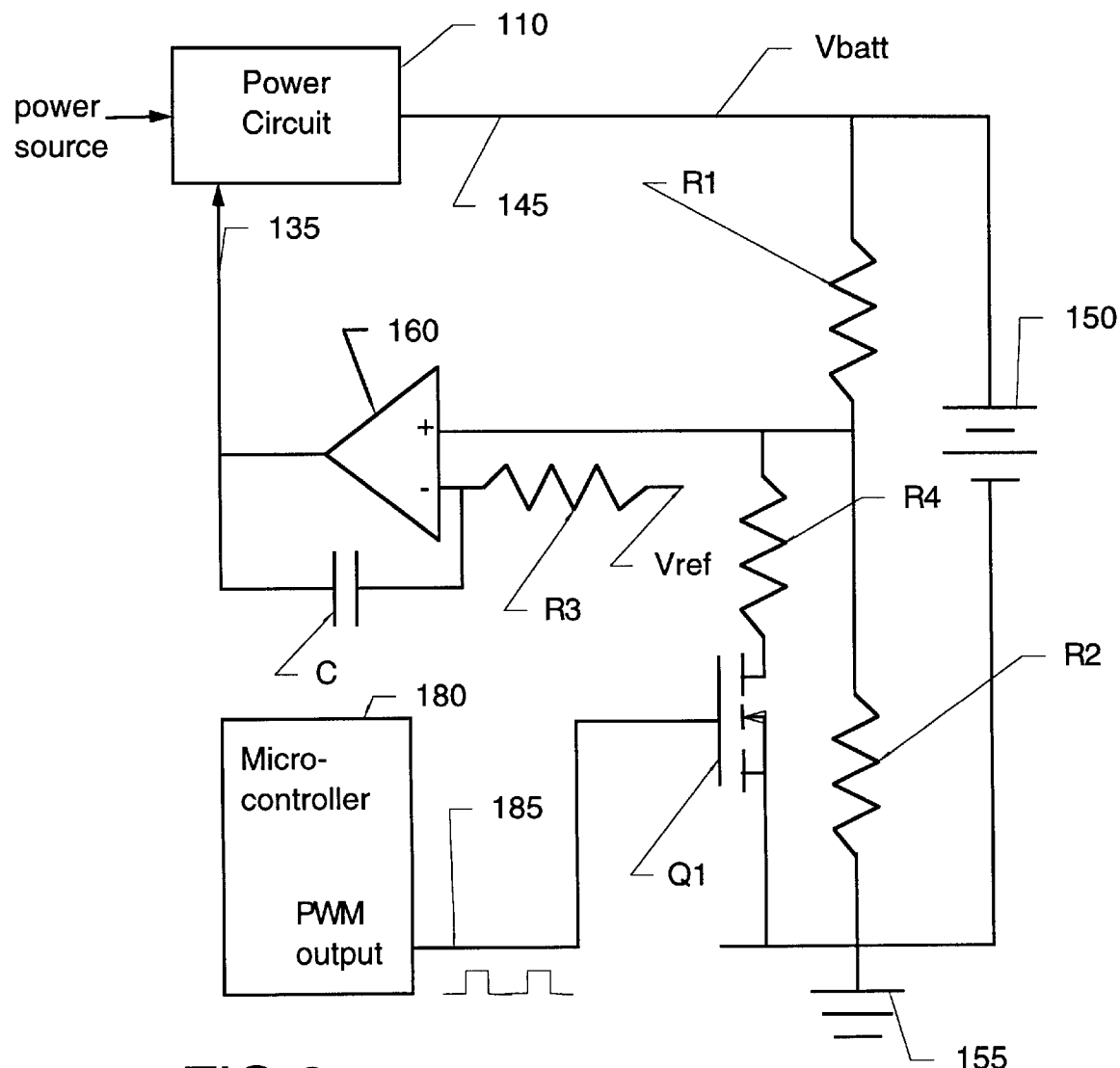
FIG. 2 is a schematic diagram illustrating a preferred embodiment of the present invention for programmably adjusting its output voltage for battery charging by applying a control signal from a microcontroller.

FIG. 2 illustrates a preferred circuit embodiment 200 of the present invention. Other than the component values (e.g., values for resistors and capacitors, etc.) and the addition of a microcontroller 180, a transistor $Q_1$, and a resistor $R_4$, the circuit schematic for the embodiment 200 is the same as that of FIG. 1. Therefore, the above Equation 1 is also applicable to the circuit embodiment 200 as illustrated in FIG. 2. The microcontroller 180 is implemented to have access to battery information including manufacturer-specified charging voltages. Such information may be pre-set at the time of manufacture or to be received from the battery(ies) 150 in use. The microcontroller 180 has an analog or a pulse width modulated (PWM) signal output over a lead 185 feeding into the transistor $Q_1$ and configured in a manner that the PWM signal output from the microcontroller 180 can be used to turn the transistor $Q_1$ ON and OFF. The transistor $Q_1$, may be a MOSFET, is disposed in series with $R_4$ and this serial combination is disposed in electrical parallel with the one resistor of the resistive voltage divider 120. In FIG. 2, that resistor is resistor $R_2$.

To better appreciate the present invention, the concepts of duty ratio and effective resistance as used herein need clarification. The duty ratio, d, of the PWM signal output is defined as the ON time of the transistor $Q_1$ divided by the period of the PWM signal output. The effective resistance of the resistor $R_2$ is defined according to the following Equation 2:

$$R_2(eff)=d\times(R_2\times R_4)/(R_2+R_4)+(1-d)\times R_2. \qquad (Eq.\ 2)$$

One aspect of the present invention is to use a PWM signal output from the microcontroller 180 to control the operations of the transistor $Q_1$ and in turn controlling the effective resistance of the resistor $R_2$ as it is applied to Equation 1 and further in turn adjusting the output voltage $V_{batt}$ values for charging batteries of different types and technologies. In one implementation, this microcontroller 180 includes a 8-bit resolution at a predetermined and fixed frequency (e.g., 1 kilohertz) for producing 255 different (non zero) pulse widths. The transistor $Q_1$ is adapted to be ON whenever a pulse occurs in the PWM signal output.

On the one hand, if the duty ratio is zero, d=0, then the transistor $Q_1$ is continuously OFF due to a lack of pulses in the PWM signal output. This effectively removes $R_4$ from the circuit embodiment 200 whereby leaving the divider ratio in Equation 1 intact and providing a minimum voltage value of the $V_{batt}$. On the other hand, if the duty ratio is one, d=1, then the transistor $Q_1$ is continuously ON. This effectively places $R_4$ in electrical parallel with $R_2$ whereby decreasing the effective resistance of $R_2$ due to the $R_2$-$R_4$ parallel combination, as well as increasing the divider ratio and $V_{batt}$ of Equation 1 to their maximum values. If the transistor $Q_1$ is alternately turned ON and OFF due to the fact that the duty ratio is between zero and one, 0<d<1, then the output voltage $V_{batt}$ from the power circuit 110 will be the average of the voltages given by the ON and OFF state of the transistor $Q_1$, weighted in proportion to the time the transistor $Q_1$ is in each state. This operation is made possible because batteries are static loads and their charging voltage requirements do not change dynamically. Therefore, a relatively slow error amplifier circuit, for example, having a roll off frequency at 100 Hz which is 10% of the PWM frequency, certainly "views" the alternate ON and OFF $Q_1$ in a weighted manner as described. Such a roll-off frequency for the operational amplifier 160 is implemented by the $R_3$ and C combination of the error amplifier circuit 130. Other elements may be added to this circuit embodiment 200 for improving upon existing features or implementing new features such as removal of power supply and signal variations and prevention of parasitic voltage loss in a known manner.

A possible range of the output voltage $V_{batt}$ for battery charging is from zero to the power supply voltage (not shown) of the apparatus 200. However, practically speaking, a typical set of manufacturer-specified charging voltages for different battery types and technologies in the market today clusters within a relative narrow range. For example, for a three- or four-cell Lithium ion design, the range is from about 12.0 volts to 17.0 volts whereas for four-cell Lithium ion battery packs of different manufacturers, the range is from 16.0 volts to about 17.0 volts. Obviously, the more narrow the voltage range, the higher will be the resolution and accuracy of the output voltage $V_{batt}$. As an illustration, an output voltage $V_{batt}$ ranging from 16.0 volts to 17.0 volts with a 8-bit PWM resolution results in a single step resolution of about 3.9 millivolts. Such fine resolution is sufficient to meet the needs of batteries of different makes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A constant-voltage battery charger for charging at least one battery, the battery charger comprising:
    a voltage divider network including at least two resistive elements in series and said two resistive elements being disposed in electrical parallel to the at least one battery;
    a power circuit for generating an output voltage of the battery charger from an incoming power source and an incoming error signal; said power circuit being adapted for applying the output voltage to the at least one battery and the voltage divider network;
    a control circuit including a control resistor serially connected to a MOSFET, said control resistor and said MOSFET being disposed in electrical parallel to one of the at least two resistive elements of the voltage divider network, said control circuit having one end connected to an electrical ground;
    a controller being connected to the MOSFET and adapted for switching the MOSFET ON and OFF, said MOSFET being responsive to a pulse width modulated output signal having a programmable duty cycle operating at a pre-determined frequency from the controller; and
    a comparison circuit including an operational amplifier for generating the error signal by comparing between a pre-determined voltage reference and the voltage across the control circuit, said comparison circuit being configured to roll off at a frequency much lower than the pre-determined frequency of the pulse width modulated output signal.

2. A battery charger for charging at least one battery, the battery charger comprising:
    a voltage divider network including at least two resistive elements in series and said two resistive elements being disposed in electrical parallel to the at least one battery;
    a power circuit for generating an output voltage of the battery charger from an incoming power source and an incoming error signal; said power circuit being adapted for applying the output voltage to the at least one battery and the voltage divider network;
    a control circuit including a resistive control element serially connected to a transistive element, said resistive control element and said transistive element being disposed in electrical parallel to one of the at least two resistive elements of the voltage divider network;
    a controller connected to the transistive element and adapted for turning the transistive element ON and OFF, said transistive element being responsive to a programmable output signal operating at a pre-determined frequency from the controller; and
    a comparison circuit for generating the error signal by comparing between a pre-determined voltage reference and the voltage across the control circuit, said comparison circuit being configured to roll off at a frequency much lower than the pre-determined frequency of the programmable output signal.

3. The battery charger of claim 2 wherein the transistive element is a MOSFET.

4. The battery charger of claim 2 wherein the resistive control element is a resistor.

5. The battery charger of claim 2 wherein the control circuit has one end connected to an electrical ground.

6. The battery charger of claim 2 wherein the programmable output signal is a pulse width modulated signal having a programmable duty cycle.

7. The battery charger of claim 6 wherein the programmable duty cycle has an 8-bit resolution of 256 steps.

8. The battery charger of claim 2 wherein the predetermined frequency is at least 10 times higher than the roll off frequency of the comparison circuit.

9. The battery charger of claim 8 wherein the pre-determined frequency is at least 1 K Hz and the roll off frequency of the comparison circuit is approximately 100 Hz.

10. The battery charger of claim 2 wherein the comparison circuit includes an operational amplifier.

11. A battery charger for charging at least one battery, the battery charger comprising:
    a power circuit for generating an output voltage of the battery charger from an incoming power source and an incoming error signal; said power circuit being adapted for applying the output voltage to the at least one battery;
    a control circuit providing feedback to the power circuit by generating the error signal; and
    a controller electrically connected to the control circuit for generating a variably programmable pulse width modulated signal in accordance with a predetermined set of instructions for modifying the error signal whereby setting the output voltage at a voltage value between a maximum value and a minimum value.

* * * * *